(12) United States Patent
Ota

(10) Patent No.: US 8,221,650 B2
(45) Date of Patent: Jul. 17, 2012

(54) $AL_2O_3$-$SIO_2$-BASED OXIDE PHOSPHOR

(75) Inventor: Masato Ota, Tokyo (JP)

(73) Assignee: Shibaura Institute of Technology, Tokyo (JP)

( * ) Notice: Subject to any disclaimer, the term of this patent is extended or adjusted under 35 U.S.C. 154(b) by 578 days.

(21) Appl. No.: 12/405,764

(22) Filed: Mar. 17, 2009

(65) Prior Publication Data

US 2010/0052502 A1    Mar. 4, 2010

(30) Foreign Application Priority Data

Aug. 26, 2008  (JP) ................................. 2008-217167

(51) Int. Cl.
*C09K 11/64* (2006.01)
*C09K 11/59* (2006.01)

(52) U.S. Cl. ............. 252/301.4 R; 252/301.4 F; 313/486

(58) Field of Classification Search ............ 252/301.4 F, 252/301.4 R; 313/486
See application file for complete search history.

(56) References Cited

U.S. PATENT DOCUMENTS 3,359,211 A * 12/1967 Jaffe ....................... 252/301.4 F
3,503,894 A * 3/1970 Wachtel .................. 252/301.4 F

FOREIGN PATENT DOCUMENTS

| JP | 2002-088359 | 3/2002 |
|---|---|---|
| JP | 2006-083217 | 3/2006 |
| JP | 2007-103512 | 4/2007 |
| JP | 2007-238879 | 9/2007 |

OTHER PUBLICATIONS

Hirata, M. et al., "Synthesis of phosphors of mullite host materials," *Ceramic Research Conference of Kanto Branch*, p. 77, Jul. 24, 2008.
Hirata, M. et al., "Synthesis of phospors of Mullite host materials," *Annual Meeting of the Ceramic Society of Japan*, 2008, p. 271, Mar. 20, 2008.
Kutty, T.R.N. et al., "Photoluminescence of $Eu^{2+}$-doped Mullite ($xAl_2O_3 \cdot ySiO_2$; x/y=3/2 and 2/1) prepared by a hydrothermal method," *Material Chemistry and Physics*, 65:158-165, 2000.
Nogami, M. et al., "Fluoresence properties of $Sm^{2+}$ ions in silicate glasses," Jul. 1, 1996, *J. Appl. Phys.*, Japan, 80(1):409-414.
Piriou, B. et al., "Time—Resolved Fluorescence Spectroscopy of $Cr^{3+}$ in Mullite," *Journal of the European Ceramic Society*, 16:195-201, 1996.

* cited by examiner

*Primary Examiner* — Carol M Koslow

(57) ABSTRACT

An oxide phosphor that is highly durable and produces visible light when excited by exposure to near-ultraviolet excitation light, comprising an oxide having the composition represented by the formula $(Al_2O_3)_x \cdot (SiO_2)_{1-x}$, where $0<x<1$, and an activating element M.

4 Claims, 1 Drawing Sheet

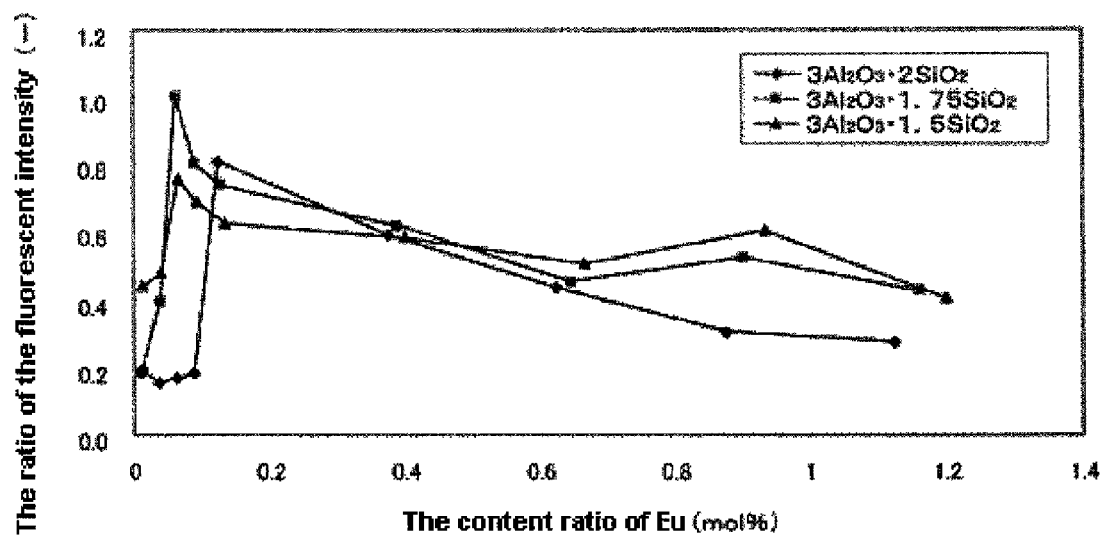

AL$_2$O$_3$-SIO$_2$-BASED OXIDE PHOSPHOR

BACKGROUND OF THE INVENTION

1. Field of the Invention

The present embodiment relates to a phosphor that produces fluorescence when excited by exposure to excitation light and, in particular, an Al$_2$O$_3$—SiO$_2$-based oxide phosphor.

2. Description of the Related Art

Phosphors that produce visible light when excited by exposure to near-ultraviolet light are used in, for example, luminescent apparatuses constituted of such a phosphor and a source of near-ultraviolet light, such as a semiconductor LED device, in combination therewith (e.g., see Japanese Unexamined Patent Application Publication No. 2007-103512).

However, such phosphors have some problems. For example, they are based on expensive complex oxides of decreasing availability or otherwise unsatisfactory in terms of durability.

This unsatisfactory situation causes demand for a novel phosphor that is highly durable and produces visible light when excited by exposure to near-ultraviolet excitation light.

SUMMARY OF THE INVENTION

The inventors of the present invention conducted extensive research and found that an Al$_2$O$_3$—SiO$_2$-based oxide generates fluorescence when activated by an activator, thereby completing the present embodiment.

The phosphor according to the present embodiment, an Al$_2$O$_3$—SiO$_2$-based oxide that is easily available and has a high melting point, excellent insulation properties, a high mechanical strength, and a low thermal expansion coefficient is used as a host material, thereby enabling producing highly durable phosphors at low cost.

BRIEF DESCRIPTION OF THE DRAWING

FIG. 1 is a line plot that represents the relationship between the content ratio of Eu (mol %) and the fluorescent intensity.

DESCRIPTION OF THE PREFERRED EMBODIMENTS

The following are detailed descriptions of the present embodiment.

The phosphor according to the present embodiment uses an Al$_2$O$_3$—SiO$_2$-based oxide as a host material. In particular, an Al$_2$O$_3$—SiO$_2$-based oxide having a composition of $(Al_2O_3)_x \cdot (SiO_2)_{1-x}$ ($0.5 \leq x \leq 0.7$) provides a high fluorescent intensity.

In the embodiment, a high fluorescent intensity can be achieved when the Al$_2$O$_3$—SiO$_2$-based oxide comprises mullite which is the only stable compound. There are no limitations on Mullite composition. The composition may be, for example, $(Al_2O_3)_x \cdot (SiO_2)_{1-x}$ ($0.5 \leq x \leq 0.7$) or $(Al_2O_3)_x \cdot (SiO_2)_{1-x}$ ($0.6 \leq x \leq 0.67$).

Also, there are no limitations on mullite content in the Al$_2$O$_3$—SiO$_2$-based oxide. The content may be, for example, 50 mass % or higher, 75 mass % or higher, 90 mass % or higher, or 100 mass %.

For example, an embodiment of the Al$_2$O$_3$—SiO$_2$-based oxide includes mullite having a composition of $3Al_2O_3 \cdot 2SiO_2$, $3Al_2O_3 \cdot 1.75SiO_2$, or $3Al_2O_3 \cdot 1.5SiO_2$ or a mixture thereof.

The phosphor according to the present embodiment is activated by an activating element, M. Examples of the activating element M include Ag and lanthanoids, such as Ce, Sm, Eu, Yb, and Dy. In particular, Ce and Eu would be advantageous in ensuring luminance efficiency.

The activating element M may exist as divalent or trivalent ions in the phosphor according to the present embodiment. In particular, the luminous efficiency of the phosphor tends to become high when the lanthanoids exist as divalent ions.

The activating element M may take any form in the phosphor according to the present embodiment as long as it is contained in the Al$_2$O$_3$—SiO$_2$-based oxide. It may be incorporated into the Al$_2$O$_3$—SiO$_2$-based oxide to form a solid solution or it may exist in the grain boundaries or between the crystalline layers of the Al$_2$O$_3$—SiO$_2$-based oxide.

There are no limitations on the content of the activating element M, and the content may be, for example, in the range of 0.001 to 2.0 mol %, 0.001 to 1.0 mol %, 0.01 to 0.5 mol %, or 0.01 to 0.2 mol %, relative to the total amount(mol) of Al and Si.

A method for manufacturing the phosphor according to the present embodiment is described below.

There are no limitations on the production method for the phosphor according to the present embodiment, and it may be produced by, for example, mixing an activating element M source and an Al$_2$O$_3$—SiO$_2$-based oxide and/or a starting materials thereof followed by sintering the mixture.

There is no limitation on the sintering temperature. When an Al$_2$O$_3$—SiO$_2$-based oxide and an activating element M are mixed and sintered, the sintering temperature may be, for example, a temperature equal to or lower than the melting point of the Al$_2$O$_3$—SiO$_2$-based oxide. More specifically, the sintering temperature may be in the range of from 1000 to 1800° C., from 1100 to 1700° C., or from 1200 to 1600° C.

Similarly, there is no limitation on the sintering time. The sintering time may be in the range of from a few hours to a dozen hours, or from one to ten hours, or from three to seven hours.

There is no limitation on the sintering atmosphere, and the sintering process may be conducted, for example, in vacuum, in a nitrogen atmosphere, or in an air atmosphere. In the present embodiment, in the case where the activating element is a lanthanoid, the fluorescent intensity tends to become high when the sintering process is conducted in a reducing atmosphere, such as a hydrogen atmosphere. The reason for this is unclear; however, it is presumed that when the sintering process is conducted in a reducing atmosphere, lanthanoid atoms would be incorporated in the Al$_2$O$_3$—SiO$_2$-based oxide as divalent ions.

There is no limitation on the preparation method of the Al$_2$O$_3$—SiO$_2$-based oxide, and it may be prepared by any known method. For example, the Al$_2$O$_3$—SiO$_2$-based oxide may be prepared by a sol-gel method.

In addition, the Al$_2$O$_3$—SiO$_2$-based oxide may be prepared at the same time as the phosphor by mixing starting materials of the oxide (e.g., Al and Si) with a lanthanoid atoms source and then sintering the mixture.

When mullite is used as the Al$_2$O$_3$—SiO$_2$-based oxide, the oxide may be provided in the form of mullite crystals, or may be provided as a mullite precursor, such as an amorphous phase and then be transformed into mullite crystals by adjusting a sintering conditions or cooling conditions in the sintering step after being mixed with an activating element.

The activating element source to be used in the production of the phosphor according to the present embodiment is not limited, and examples thereof include an element alone, oxide, hydroxide, chloride, fluoride, carbonate, sulfate, nitrate, and acetate of the activating element.

A luminescent apparatus such as a plasma screen and a white light-emitting diode can be provided by combining the oxide phosphor according to the present embodiment and a luminous device that generates light exciting the phosphor.

The present embodiment is illustrated in detail by the following examples; however, these examples impose no limitation on the present embodiment.

EXAMPLE 1

1. Synthesis of a Mullite Precursor ($3Al_2O_3 \cdot 2SiO_2[(Al_2O_3)_{0.6} \cdot (SiO_2)_{0.4}]$)

A mullite precursor was synthesized using a sol-gel method as follows.

A solution of 135 g of aluminum nitrate nonahydrate in 200 mL of ethanol and a solution of 27.6 mL of tetraethyl orthosilicate in 200 mL of ethanol were added in a round-bottom flask, and then 160 mL of an ammonium hydroxide solution (25 mass %) was added thereto. This mixture was heated at 60° C. and hydrolyzed for two hours while being stirred. Then, the obtained amorphous gel was heated at 110° C. for the removal of the solvent and then preliminary sintered at 300° C. The resulting product was transferred in an electric furnace and sintered under an air atmosphere at 1200° C. for two hours to give a mullite precursor.

2. Production of a Phosphor

In ethanol, 2.0 g of the obtained mullite precursor was wet-mixed with 0.017 g of $Eu_2O_3$. The mixture was dried naturally, transferred in an alumina crucible, and sintered under a reducing atmosphere with a hydrogen gas flow (95% of nitrogen and 5% of hydrogen), at 1500° C. for five hours with the electric furnace used in Step 1.

3. Identification of the Sample

The obtained sample was subjected to a wet chemical analysis based on alkali fusion and, the constituent elements were proved to be Al, Si, Eu, and O.

Subsequent X-ray powder diffractometry using an X-ray diffractometer (Shimadzu Corporation, XD-D1 [Cu-Kα radiation]) revealed that the sample consisted of a single-phase mullite ($3Al_2O_3 \cdot 2SiO_2$) and contained no other crystalline phases. Therefore, it is presumed that Eu was incorporated into the mullite crystals to form a solid solution.

4. Evaluation of Fluorescence Properties

The obtained sample was evaluated for fluorescence properties using a fluorescent spectrophotometer (Hitachi, Ltd., F-3000). The maximum excitation wavelength and maximum emission wavelength are shown in the table.

EXAMPLE 2

A phosphor was produced in the same way as Example 1 except that, in Step 2, an air atmosphere was used instead of a reducing atmosphere with a hydrogen gas flow at the time of sintering the mixture of the mullite precursor and $Eu_2O_3$.

The obtained sample consisted of the same elements as Example 1, and the crystal structure thereof was a single phase-mullite. The maximum excitation wavelength and maximum emission wavelength measured for this sample are also shown in the table.

EXAMPLE 3

A phosphor was produced in the same way as Example 1 except that 0.049 g of $Sm_2O_3$ was used instead of $Eu_2O_3$.

The crystal structure of the obtained sample was a single-phase mullite. The maximum excitation wavelength and maximum emission wavelength measured for this sample are also shown in the table.

EXAMPLE 4

A phosphor was produced in the same way as Example 3 except that, in Step 2, an air atmosphere was used instead of a reducing atmosphere with a hydrogen gas flow at the time of sintering the mixture of the mullite precursor and $Sm_2O_3$.

The crystal structure of the obtained sample was a single-phase mullite. The maximum excitation wavelength and maximum emission wavelength measured for this sample are also shown in the table.

EXAMPLE 5

A phosphor was produced in the same way as Example 1 except that 0.024 g of $CeO_2$ was used instead of $Eu_2O_3$.

The crystal structure of the obtained sample was a single-phase mullite. The maximum excitation wavelength and maximum emission wavelength measured for this sample are also shown in the table.

EXAMPLE 6

A phosphor was produced in the same way as Example 1 except that 0.055 g of $Yb_2O_3$ was used instead of $Eu_2O_3$.

The crystal structure of the obtained sample was a single-phase mullite. The maximum excitation wavelength and maximum emission wavelength measured for this sample are also shown in the table.

EXAMPLE 7

A phosphor was produced in the same way as Example 1 except that 0.052 g of $Dy_2O_3$ was used instead of the $Eu_2O_3$.

The crystal structure of the obtained sample was a single-phase mullite.

EXAMPLE 8

A phosphor was produced in the same way as Example 1 except that 2 g of the mullite precursor was mixed with 0.2 g of $Ag_2SO_4$ and then 0.0020 g of the obtained mixture was further mixed with 2 g of the mullite precursor and the resulting mixture was used as a starting material.

The crystal structure of the obtained sample was a single-phase mullite.

The table below lists the maximum excitation wavelengths, maximum emission wavelengths, and the visually observed fluorescence color of the individual samples.

TABLE 1

| | Activating element | Sintering atmosphere | Maximum excitation wavelength (nm) | Maximum emission wavelength (nm) | Fluorescence color |
|---|---|---|---|---|---|
| Example 1 | Eu | Hydrogen | 307 | 454 | Blue |
| Example 2 | | Air | 307 | 405 | Purple |
| Example 3 | Sm | Hydrogen | 368 | 757 | Red |
| Example 4 | | Air | 368 | 757 | Red |
| Example 5 | Ce | Hydrogen | 307 | 411 | Blue |
| Example 6 | Yb | Hydrogen | 314 | 454 | Blue |
| Example 7 | Dy | Hydrogen | Not determined | Not determined | White |

TABLE 1-continued

| | Activating element | Sintering atmosphere | Maximum excitation wavelength (nm) | Maximum emission wavelength (nm) | Fluorescence color |
|---|---|---|---|---|---|
| Example 8 | Ag | Hydrogen | Not determined | Not determined | Blue |

When exposed to near-ultraviolet excitation light, the phosphors of Examples 1 to 8 were all excited and emitted visible light. In particular, the examples containing Eu or Sm as the activating element emitted intense light.

In the examples comprising Eu as the activating element the maximum emission wavelength of the phosphor sintered in a hydrogen gas flow was different from that of the phosphor sintered in an air atmosphere. This is probably because sintering in a hydrogen gas flow (a reducing atmosphere) reduced $Eu^{3+}$ to $Eu^{2+}$. On the other hand, in the examples comprising Sm as the activating element, the difference in the sintering atmosphere had no effect on the maximum emission wavelength of the resulting phosphors. This is probably because $Sm^{3+}$ is very likely to be reduced and thus it is reduced to $Sm^{2+}$ by being sintered even in an air atmosphere.

EXAMPLE 9

Two mullite precursors, $3Al_2O_3 \cdot 1.75SiO_2$ and $3Al_2O_3 \cdot 1.5SiO_2$, were prepared in addition to $3Al_2O_3 \cdot 2SiO_2$ in the same way as Example 1 except that the additive ratio of aluminum nitrate and tetraethyl orthosilicate used in the synthesis of the mullite precursor was modified.

Subsequently, phosphors were produced from each of the three mullite precursors in the same way as Example 1 except that the additive amount of $Eu_2O_3$ mixed with the mullite precursor was modified so that the content ratio of Eu in each of the resulting phosphors was varied. The fluorescent intensity (relative intensity) of the obtained phosphors were measured, and the results was shown in FIG. 1. It should be noted that, in FIG. 1, the vertical axis represents the ratio of the fluorescent intensity of each of the phosphors to the maximum value among each of the measured intensities (relative intensity of each phosphor), whereas the horizontal axis represents the content ratio of Eu (mol %)(percentage relative to the total amount (mol) of Al and Si).

As seen in FIG. 1, the relationship between the content ratio of Eu and the fluorescent intensity was similar among the phosphors regardless of the difference in the composition of the mullite as the host material. Furthermore, every sample exhibited the maximum fluorescent intensity when the content ratio of Eu was approximately 0.06 mol %, and the fluorescent intensity no longer increased with an increase in the content ratio of Eu.

Reference Example

Phosphors were produced from three mullite precursors, $3Al_2O_3 \cdot 2SiO_2$, $3Al_2O_3 \cdot 1.75SiO_2$, and $3Al_2O_3 \cdot 1.5SiO_2$, in the same way as Example 9 except that the additive amount of $EU_2O_3$ was modified so that the content ratios of Eu in the resulting phosphors were varied. X-ray powder diffractometry of the obtained phosphors revealed that the phosphors with a content ratio of Eu to the mullite (percentage relative to the total amount (mol) of Al and Si) of 0.4 mol % or lower consisted of a single-phase mullite, regardless of the composition of mullite. However, when the content ratio of Eu was 0.6 mol % or higher, crystal phases having a composition of $Eu_{0.92}(Al_{1.76}Si_{2.24}O_8)$ formed in addition to the mullite. Therefore, the upper limit of the content ratio of Eu where Eu can be incorporated in mullite as a solid solution is considered to be 0.4 mol % (percentage relative to the total amount (mol) of Al and Si).

INDUSTRIAL APPLICABILITY

Consequently, luminescent apparatuses with any of these examples can be used in, for example, plasma screens, white light-emitting diode and lighting fixtures using the same, and backlight for liquid crystal displays.

What is claimed is:

1. An oxide phosphor comprising:
   an oxide having a composition represented by formula (1); and
   an activating element M,
   wherein M is selected from the group consisting of Ce, Sm, Eu, Yb, Dy and Ag, and
   wherein the additive amount of M is 0.06 mol % relative to the total amount (mol) of Al and Si:
   formula (1) $(Al_2O_3)_x \cdot (SiO_2)_{1-x}$ wherein x in formula (1) is in the range of: $0.5 \leq x \leq 0.7$.

2. The oxide phosphor according to claim 1, wherein the oxide, having a composition represented by formula (1), is mullite.

3. The oxide phosphor according to claim 2, wherein the mullite is $3Al_2O_3 \cdot 2SiO_2$, $3Al_2O_3 \cdot 1.75SiO_2$, or $3Al_2O_3 \cdot 1.5SiO_2$.

4. A luminescent apparatus comprising:
   a phosphor layer comprising the oxide phosphor according to claim 1; and
   a luminous device that generates light exciting the oxide phosphor.

* * * * *

UNITED STATES PATENT AND TRADEMARK OFFICE
CERTIFICATE OF CORRECTION

PATENT NO. : 8,221,650 B2
APPLICATION NO. : 12/405764
DATED : July 17, 2012
INVENTOR(S) : Ota Page 1 of 1

It is certified that error appears in the above-identified patent and that said Letters Patent is hereby corrected as shown below:

On the Title Page, in Item (56), under "OTHER PUBLICATIONS", in Column 2, Line 9, delete ""Fluoresence" and insert -- "Fluorescence --, therefor.

On the Title Page, in Item (56), under "OTHER PUBLICATIONS", in Column 2, Line 3, delete "phospors" and insert -- phosphors --, therefor.

In the Specifications:

In Column 1, Line 43, delete "DESCRIPTION" and insert -- DETAILED DESCRIPTION --, therefor.

In Column 5, Line 14, delete "element" and insert -- element, --, therefor.

Signed and Sealed this
Twenty-third Day of April, 2013

Teresa Stanek Rea
*Acting Director of the United States Patent and Trademark Office*